United States Patent Office 3,465,770
Patented Sept. 9, 1969

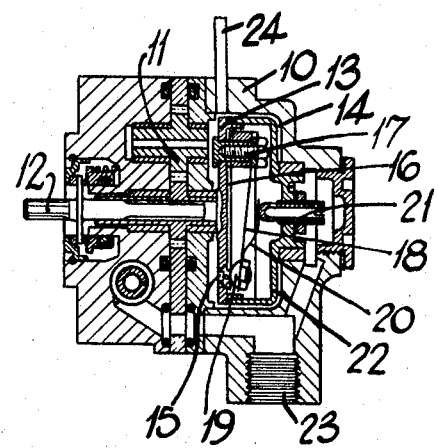

3,465,770
SPEED RESPONSIVE GOVERNORS
Dorian Farrar Mowbray, Burnham, England, assignor to Joseph Lucas (Industries) Limited, Birmingham, England
Filed Mar. 6, 1967, Ser. No. 620,956
Int. Cl. G05d 13/14
U.S. Cl. 137—56                                    1 Claim

ABSTRACT OF THE DISCLOSURE

A speed responsive governor comprising a body, a rotor, the rotor having an off-set orifice, a closure member carried by the rotor and associated with the orifice to control flow therethrough, and a weight carried by the rotor and arranged in response to speed to act upon the closure member.

BACKGROUND OF THE INVENTION

This invention relates to speed responsive governors having means for controlling the flow of fluid through an orifice in accordance with changes in rotational speed.

The invention is particularly suitable though not exclusively for use in relation to the control of the supply of liquid fuel to an internal combustion engine in accordance with the speed of the engine.

The object of the invention is to provide a speed responsive governor in a convenient form.

SUMMARY OF THE INVENTION

In accordance with the present invention, a speed responsive governor comprises a body, a hollow rotor mounted within the body, a driving shaft extending out of the body and connected to the rotor, an inlet for liquid into the interior of the body, an outlet for liquid in the body, the rotor having an orifice offset from its rotational axis, through which liquid escapes from the interior of the rotor, a closure member mounted on the rotor at a position offset from the axis of rotation, said position being at the opposite side of the axis from the orifice, the closure member extending over the orifice to control the flow of liquid therethrough, and a weight mounted on the rotor independently of the closure member at the position at which the closure member is mounted, and the weight being arranged to engage the closure member adjacent to the orifice to control the position of the closure member in accordance with the speed of rotation of the rotor.

BRIEF DESCRIPTION OF THE DRAWINGS

The invention will now be described with reference to the accompanying drawing which is a cross-sectional view of a governor constructed in accordance with the present invention, and intended for use in association with a fuel control system for a gas turbine engine.

DETAILED DESCRIPTION OF THE INVENTION

The governor in the drawing is disposed in a body 10 which also houses a gear type pump indicated generally at 11. The pump and governor are driven from the engine through a common shaft 12 and the governor comprises a rotor 13 mounted upon the shaft 12 for rotation within a chamber 14 defined within the body 10, the rotor 13 having near its periphery an orifice 15 across which extends a blade-like closure member 16 which is connected to the rotor 13 at a position substantially diametrically opposite to the orifice 15. To secure the closure member 16 to the rotor 13 there is a pair of bolts 17 which also serves to mount on the rotor 13, a blade spring 18 carrying, at its free end, a weight 19. The weight 19 is disposed in substantial alignment with the orifice 15 in the rotor 13 and is biased against the closure member 16 in a direction to prevent flow of fuel through the orifice 15. To adjust the tension of the blade spring 18 tending to move the weight into said position to cause the closure member 16 to close the orifice 15, the spring 18 has a second blade 20 connected to it, this blade 20 being engageable against an adjustable stop 21 mounted in a cover 22 which is secured to the rotor 13 to define an enclosure to which fuel can flow through the orifice 15 under the control of the closure member 16. Fuel can leave this enclosure through the hollow interior of the stop 21.

The fuel system with which the governor is intended to be used has the pump 11 for supplying fuel in excess of the quantity required to the chamber 14 and thence to the engine through a passage 24. The excess fuel is returned through the orifice 15, the enclosure defined between the rotor 13 and the cover 22, and the stop 21, to an inlet passage 23 to the pump 11. The speed of rotation controls the position of the weight 19 moving against its spring 18, and therefore the quantity of fuel which is diverted through the orifice 15. It will be appreciated that the governor can be used to provide a signal obtained by a measurement of the pressure of fuel leaving the enclosure within the rotor 13 and cover 22 or by a measurement of the pressure of fuel leaving the pump 11, this being varied by the opening of the orifice 15. These systems will however require additional associated equipment for signal measurement.

The governor in the example shown is capable of being used at relatively high speeds, for example, up to 40,000 revolutions per minute, the lower limit being approximately 6,000 revolutions per minute. The weight 19 is therefore relatively small and its permitted travel is also relatively small, being in this example, in the order of 0.05 inch.

The governor may be modified in such a way that increasing speed of the rotor moves the weight towards a position to tend to close the orifice 15 as opposed to opening it, as in the example shown in the drawing. With this arrangement, the quantity of fuel returned to the pump inlet is reduced with increasing engine speed.

Having thus described my invention what I claim as new and desire to secure by Letters Patent is:

1. A speed responsive governor comprising a body, a hollow rotor mounted within the body, a driving shaft extending out of the body and connected to the rotor, an inlet for liquid into the interior of the body, an outlet for liquid in the body, the rotor having an orifice offset from its rotational axis, through which liquid escapes from the interior of the rotor, a closure member mounted on the rotor at a position offset from the axis of rotation, said position being at the opposite side of the axis from the orifice, the closure member extending over the orifice to control flow of liquid therethrough, and a weight mounted on the rotor independently of the closure member at the position at which the closure member is mounted, and the weight being arranged to engage the closure member adjacent to the orifice to control the position of the closure member in accordance with the speed of rotation of the rotor.

References Cited

UNITED STATES PATENTS

| 2,841,161 | 7/1958 | Lee | 137—58 |
| 3,147,760 | 9/1964 | Mansfield | 137—56 |

FOREIGN PATENTS 806,747   12/1958   Great Britain.

CLARENCE R. GORDON, Primary Examiner